Jan. 30, 1951 — W. D. RHOADS — 2,539,674
SIGNAL SYSTEM FOR PREVENTING SHOCK
AND UNDESIRABLE INTERFERENCE
Filed Dec. 18, 1948
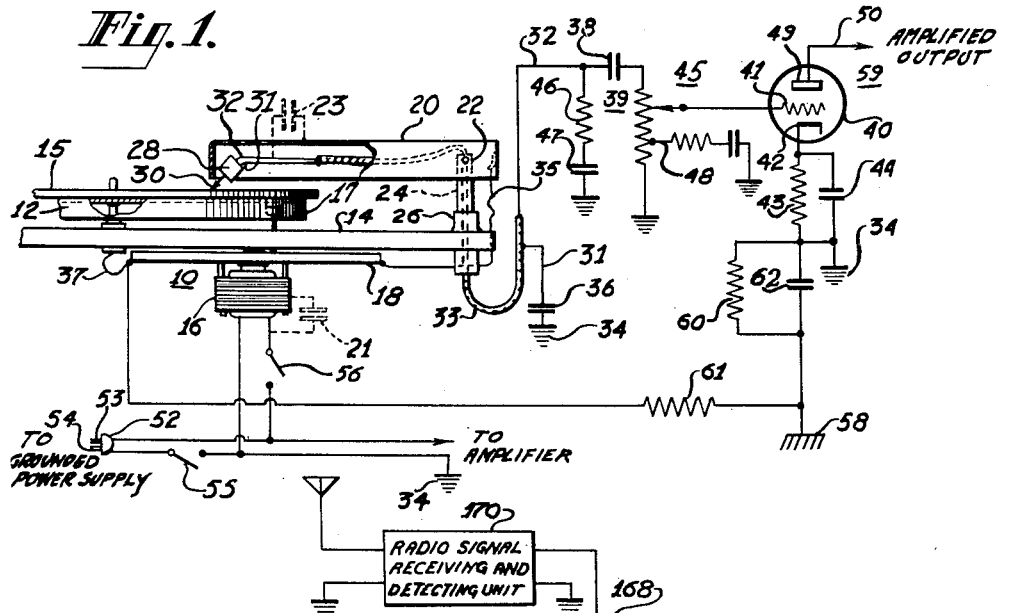
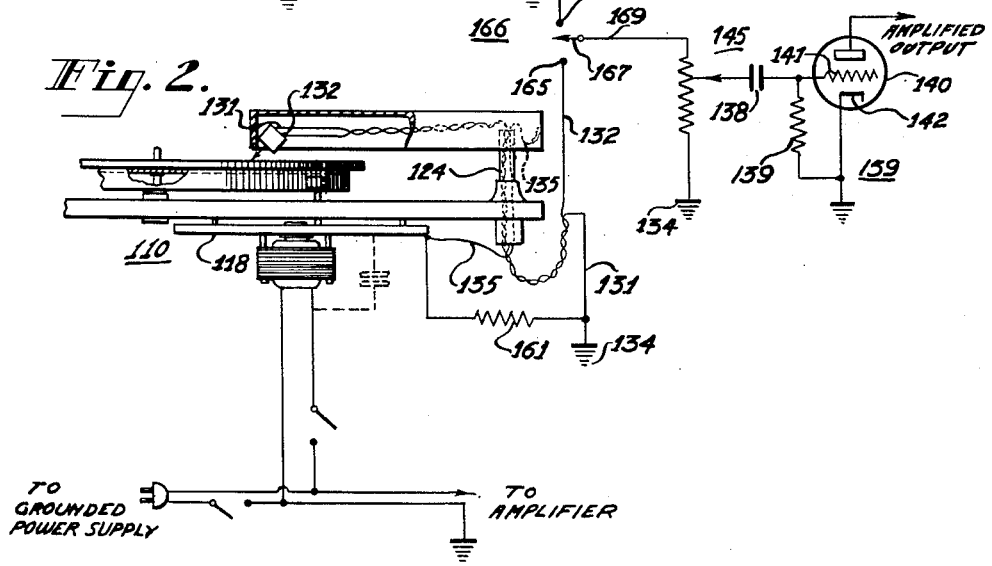
INVENTOR
WILBURT D. RHOADS
BY
ATTORNEY Patented Jan. 30, 1951

2,539,674

UNITED STATES PATENT OFFICE 2,539,674

SIGNAL SYSTEM FOR PREVENTING SHOCK AND UNDESIRABLE INTERFERENCE

Wilburt D. Rhoads, Highland Park, Pa., assignor to Radio Corporation of America, a corporation of Delaware Application December 18, 1948, Serial No. 66,052

4 Claims. (Cl. 179—100.11)

This invention relates to signal conveying systems, and more specifically, to signal conveying systems associated with alternating current power supply circuits and the like.

In the electric signal conveying art, there has always been the problem of how to satisfactorily limit the pick-up of undesired signals such as power-line hum. The standard construction of phonograph reproducers, for instance, includes a transducer pick-up and a signal output circuit more or less closely associated with electrically conductive supporting structures which in turn are apt to pick up interfering signals such as power-line hum from the ever-present alternating current power lines. Apparently because of the capacitive coupling between the transducer pickup elements and the conductive support structure, these interfering signals appear in the pick-up output circuit in objectionable amounts. To decrease such undesired interference, it is necessary to keep the conductive supporting structure at a relatively fixed reference potential. This is not always practical however, especially where the system includes an amplifier having a signal return conductor directly connected to a lead of a grounded power supply line. With such an arrangement, the direct connection of the conductive structures to the signal return conductor will suitably reduce the undesired pick-up. However, this type of connection also maintains the conductive structure at the potential of one side of the power line, and where the power supply connection happens to be of the proper polarity, there would be considerable electric shock hazard to anyone touching the conductive structures, part or all of which may be exposed. Thus if a metal phonograph tone arm, in the course of its operation, comes into contact with a part of the body while the body is grounded by means of a conventional floor for example, sufficient current may be passed through the body to cause serious electric shock. This is especially dangerous if the body is moistened as by a small amount of perspiration, and the floor is also moist, as in humid weather.

To avoid such dangers in the use of amplification systems such as small A. C.-D. C. type radio receivers where an easily exposed electrically conductive chassis is provided to hold the amplifier components, it has been the practice to provide a separate signal return for direct connection to the power line. The chassis is connected essentially only capacitively to this return. This capacitive connection effectively reduces stray amplifier pick-up but does not reduce the shock hazard sufficiently; the 0.05 to 0.1 microfarad capacitance generally used can still pass a sufficient amount of alternating current from an A.-C. power supply to effectively jolt people under some conditions. Even if no serious harm is inflicted, the capacitively connected parts may become so highly charged electrically as to become too uncomfortable and even painful to handle.

Among the objects of this invention are the provision of novel arrangements for effectively reducing undesired signal pick-up by signal carrying systems.

Other objects of the invention include the provision of novel signal transducing systems in which undesired pick-up is effectively reduced without any of the disadvantages hitherto experienced.

Further objects of the invention include the provision of signal transducing systems having amplifiers with signal return conductors arranged for direct connection to a grounded power line, and conductive parts of a signal pick-up assembly are connected to the signal return in a novel and simple manner that effectively diminishes the undesirable pickup of power hum without appreciably increasing the danger of electric shock.

Still further objects of the invention are the provision of novel transducers such as phonograph reproducers with high impedance hum diminishing connections from conductive portions to a signal return that may be one lead of a grounded power line.

The above, as well as other objects of the invention, will be more readily understood from the following description of exemplifications thereof, reference being made to the accompanying drawings wherein:

Fig. 1 is a circuit diagram, with parts in elevation, of a phonograph record reproducing system embodying the invention; and Fig. 2 is a circuit diagram similar to Fig. 1 of a modified phonograph record reproducing system according to the invention.

It has been discovered that undesired signal pickup in signal conveying systems is effectively diminished by returning electrically conductive structures associated with such a system to the signal return conductor thereof by means of a relatively high impedance connection. The high impedance also limits the passage of current to an extent that it completely removes any shock hazard resulting from the connection of the signal return directly to one side of a power supply.

Figure 1 shows one practical embodiment of phonograph reproducing system embodying the invention. A phonograph motorboard assembly 10 includes a phonograph-record-holding turntable 12 rotatably held in a socket 13 of a base 14, and having a depending rim or flange 17 driven by an electric motor 16 secured to the base as by means of an intervening mounting plate 18. The base also supports a tone arm 20 pivotally held at 22 on a pivot pin 24 which in turn is rotatably received in an enlarged boss 26 provided on the base. The free end of the tone arm 20 carries a phonograph pick-up of any suitable type diagrammatically represented at 28, the arrow 30 indicating a pickup stylus for engagement by the signal groove of a record 15 supported and rotated by the turntable.

Electric signals corresponding to the record signals are generated by the pick-up and are amplified so that they can be reproduced by devices such as the conventional loudspeakers. A practical amplifier input arrangement for receiving the pickup signals is shown in Fig. 1. Two leads 31, 32, convey the pick-up signals to the amplifier. One pickup lead 31, is connected to the signal return conductor of the amplifier represented by the symbol 34, through a coupling capacitor 36 which presents a relatively low impedance to the pick-up signals. The other pickup lead 32 is connected by means of coupling network 39 to the control electrode or grid 41 of an amplifier stage 59 including an electron-discharge tube shown as a triode 40. The return lead 31 may extend as an electric shield effectively surrounding lead 32 as indicated by the shielded section 33. In the construction of Fig. 1, the pivot pin 24 is hollow and provides a passageway for the pick-up output leads. Coupling network 39 includes a coupling capacitor 38, a volume control potentiometer 45 and a shunting connection of a resistor 46 and a series capacitor 47. The various elements of the circuit may be adjusted to provide any desired signal intensity equalization or emphasis to compensate for amplitude distortions in the pickup signals. The volume control 45 includes a tap 48 shunted by a series combination of a resistance and a capacitance for automatically varying the emphasis over the range of signal frequencies as the reproduced intensity is varied by changes in potentiometer setting to provide a signal of uniformly good quality regardless of the reproduced signal level.

Amplifier tube 40 includes a cathode 42 which is connected to the signal return 34 by means of a resistance 43 bypassed by capacitor 44. An anode 49 is connected by means of a circuit indicated by lead 50 to the positive terminal of an amplifier energizing source of direct current (not shown), the negative terminal of which is connected to the signal return 34 to complete the D.-C. energizing circuit path. The control grid 41 is biased at a suitable operating potential with respect to the cathode 42, by the D.-C. voltage drop developed across cathode return resistor 43. Amplified output signals may be taken from across a load impedance inserted in anode lead 50. The D.-C. source and the amplifier load circuit are not shown in Fig. 1 inasmuch as they may take any convenient form.

The system, including the amplifier and its D.-C. source, is illustrated as supplied with operating power by means of the usual electric outlet plug 52 having connection prongs 53, 54. One prong is connected by means of on-off power switch 55 to the signal return 34 and to the turntable motor 16. The other prong completes the power supply circuit, the motor and associated apparatus, as shown. For A. C.-D. C. type systems, the power supply circuit may include the usual rectifier (not shown) connecting the anode lead 50 to the proper prong of the plug, for passing direct current or rectifying alternating current. An additional switch 56 may be inserted in the leads to motor 16 where it is desired to operate the amplifier without the motor as for example when the amplifier forms part of a radio-phonograph combination and is selectively used for amplifying radio signals or phonograph reproduction signals. The output of amplifier stage 59 may be further amplified and then supplied to loudspeaker apparatus which form no part of the present invention.

Power lines such as those commercially supplying house current are adapted for connection with the plug 52. These lines usually have one side or lead grounded, that is, directly connected to the earth so as to be maintained at ground or earth potential. Amplifiers are conventionally built on an electrically conductive chassis or support on which all the amplifier components are mounted. In order to reduce the possibility of introduction of any undesired signals into the amplifier circuit from the chassis which is necessarily quite close to the amplifier components, efforts are made to maintain the chassis at a constant electrical potential, for example, the essentially ground potential of the signal return conductor 34. However, where there is a possibility that someone may touch the chassis, it is not always advisable to directly connect it as part of the signal return 34.

Figure 1 shows a chassis symbolically represented at 58 connected to the signal return 34 by means of capacitor 62, and parallel resistor 60. The resistor 60 is a relatively high impedance with respect to the capacitor 62 so that the pair functions substantially as a capacitance. This capacitance provides a connection which is low enough in impedance to effectively reduce the strength of undesired signals that can be developed across it, but high enough in impedance to greatly limit the flow of electric current through a person, should he have one part of his body touching the chassis 58 and another part of his body grounded. As is apparent from Figure 1, such a person will have his body connected in series with the combination 59, 60 directly across the power line. Where the isolation 62, 60 is omitted and the chassis 58 is also used as the signal return 34, the above described bodily contact could easily result in electrocution. By using a capacitive isolation of the order of 0.05 to about 0.1 microfarad bypassed if desired by about a 300,000 ohm resistance, any power line current passing through a person would be limited in amount and present no serious danger.

The introduction of undesired signals is not confined to the amplifier itself, but also has a tendency to take place at the pick-up 28 and its leads. Undesired signals at this point are subject to a considerable amount of subsequent amplification and are therefore of primary consideration. By the shielded arrangement of the leads 31, 32, the exposure to undesired signals is considerably reduced. However, there still remains a residual tendency to pick up signals such as the alternating current hum from adjacent electric supply circuits. When the system is in operation, motor 16 is energized from the power supply circuit and electrically conductive parts of the motor board including metal portions of the motor 16, the plate 18, the tone arm 20 and base 14 where these are metallic, and the turntable 12, are insulated from and relatively closely spaced with respect to the power leads. This association gives rise to a capacitance represented by the dashline capacitor 21. Similarly another capacitance indicated at 23 exists between any exposed portions of the signal output leads and the conductive elements of the motor board. As a result of these capacitances 21, 23, power line alternating current hum will be developed in the signal leads across any load impedance such as the pick-up, the pick-up load amplifier input load, etc., and appear in the amlified output signals from the apparatus. Furthermore, the higher the impedance, the higher the induced hum level.

According to the invention the introduction of undesired signals is considerably reduced by returning electrically conductive parts of the motor board 10 to the chassis 58 through a relatively high impedance shown as resistor 61. The impedance between these metal parts and the signal return 34 therefore becomes the series combination of impedance 61 and the parallel isolation elements 62, 60. It has been discovered that a signal return impedance of up to as much as five times the amplifier input impedance as at the input circuit 45 may be used in accordance with this invention without developing any serious amounts of alternating power line hum in the output of the amplifier. In other words, where the amplifier input impedance is of the order of one megohm, as is usually the case, the return impedance 61 may be as high as about 5 megohms. An impedance of so large a value, while effectively acting as a hum pickup limiting means, precludes the passage of any measurable current through the body of any person touching metal portions of the motor board. As little as 100,000 to 200,000 ohms has been found to provide the desired isolation between the motor board parts and the power line even where the system is operated from a 250 volt power source. With such an impedance no trace of tingling sensation is felt by any person touching the metal parts of the motor board even in humid weather with the body effectively grounded. A resistance of 3 megohms proves to be highly practical for commercial use. Instead of returning to the amplifier chassis, the impedance 61 may connect the conductive structure directly to the signal return conductor 34.

Attention is called to the fact that phonograph motor boards are especially prone to being manually touched as for example when the tone arm is manipulated or a phonograph record changed. To insure suitable electric bonding between the tone arm 20 in those cases where it is electrically conductive, and other metal portions of the motor board, a conductor 35 is shown as secured to the tone arm, passing through the base 14 to the motor supporting plate 18. Such bonding is especially effective when the base 14 is of non-conductive composition. Where the motor board is of the automatic record changing variety which automatically lifts the tone arm, swings it aside, changes a record, and returns the tone arm to the new record, the conductor 35 provides a suitable tone arm lifting link. With phonographs not requiring a tone arm lifting link, the connector 35 where used may be passed through the hollow pivot pin 24 so as not to encumber the tone arm manipulation. Where the base 14 is electrically non-conductive, the turntable 12 may be kept at the desired potential by connecting the turntable boss 13 to the mounting plate 18, as indicated by lead 37.

Figure 2 illustrates another modification of the invention in which the connection to a radio signal supply is shown. Here a phonograph motorboard combination 110, which may be similar to that described in connection with Fig. 1 has pick-up output leads in the form of a twisted pair of conductors 131, 132. Any undesired signals induced in one of the leads is substantially balanced by an equal and opposite signal induced in the other lead so that relatively little undesired signal appears across the pick-up load. Lead 131 is connected directly to the signal return 134 whereas lead 132 is connected to a contact 165 of a double throw switch 166 having movable blade 167 connected to input lead 169 of amplifier stage 159 including tube 140. Lead 169 goes to the high side of a shunting volume control potentiometer, the output tap of which is capacitively coupled to the control grid 141 of the amplifier tube. The amplifier cathode 142 is directly connected to the signal return 134, and the control grid bias is developed by a relatively high grid return resistor 139. Another contact 168 of switch 166 is supplied with demodulated radio signals from the radio signal receiving and demodulating unit 170. By selectable movement of the switch blade 167 to the desired contacts either radio signals or phonograph reproduction signals are delivered for amplification by stage 159. Reduced hum in the operation of the construction of Figure 2 is quite similar to that of Figure 1, a return impedance 161 linking conductive motorboard portions with the signal return. A tone-arm return lead 135 passing through hollow tone arm pin 124 electrically connects the arm to motor mounting plate 118.

If desired, the amplifier chassis in the system of Figure 2 may be directly used as the signal return conductor 134. Adequate safeguard against electric shock hazard may be provided by rendering the chassis substantially inaccessible except to skilled mechanics who can properly handle the apparatus, as for repair purposes. Alternatively, such chassis safeguards may be entirely omitted. Where precautions are taken against the shock hazard, and a pick-up signal lead has a portion that is, or may become, exposed to be touched by a person manipulating the tone arm, it may also be desirable to substitute a capacitive connection for the direct connection of lead 131 to the signal return 134.

The invention is not limited to the phonograph systems but is of considerable value in connection with any signal carrying system having electrically conductive supporting and mounting elements insulated from leads carrying signals in the frequency range of undesired signals that may be picked up by the leads. Thus transmission lines or microphone systems have such conductive elements that are, or may become, exposed to contact with the body and should therefore be protected where used with an amplifier having a signal return arranged for direct connection to one side of a grounded power line. Even without such an amplifier, the invention is extremely valuable. Thus where a local amplifier power supply is isolated from a power line, as by a transformer, and there is some danger of contact with a high voltage power supply lead while touching metal parts of a signal pick-up system, the high impedance signal return of the invention makes a very inexpensive safeguard and an effective hum pick-up reducing means.

The high impedance return of the invention may be resistive, capacitive or inductive or have any combination of these characteristics. A resistance return, however, provides a larger decrease in noise introduction than a reactance of equal impedance, making possible the maximum shock hazard reduction.

The specific amplification circuits used with the invention are subject to wide variation. Instead of the conventional amplifiers of Figures 1 and 2, other types such as non-vacuum tube system, or vacuum tubes in any other type of amplification arrangement including cathode follower or grounded grid type circuit are suitable.

While several exemplifications of the invention have been indicated and described above, it will be apparent to those skilled in the art that other modifications may be made without departing from the scope of the invention as set forth in the appended claims.

What is claimed is:

1. In an electric signal conveying system having a signal conveying transducer including electrically conductive assembly supporting structure, and signal leads at least one of which is insulated from said structure for connection to an amplifier provided with a common chassis signal return conductor, the improvement for diminishing the capacitive pick-up of undesired signals from the conductive supporting structure, which improvement comprises an impedance means connected between the conductive supporting structure and the amplifier chassis, said connector means having an impedance of at least about 100,000 ohms to said undesired signals.

2. In a phonograph record reproducing system: phonograph turntable and tone arm elements at least part of which are metallic; high impedance pick-up structure; pick-up signal output leads at least one of which is insulated from said metallic part for connection to a high impedance input amplifier having an electrically conductive chassis, and a signal return conductor essentially capacitively connected to the chassis, and a connector conductively connected to said metallic part for return to the amplifier chassis to diminish the capacitive pick-up of undesired signals, said connector having a series resistance to diminish the danger of electric shock due to contact by a grounded body with said metallic part of the system.

3. In an A. C.-D. C. type combination radio and phonograph system for selectably receiving, demodulating and amplifying radio waves and selectably transducing and amplifying phonograph recordings: demodulated radio signal supply means; phonograph reproduction signal supply means; common amplification structure including amplification elements, electrically conductive support structure holding said elements, a pair of input conductors one of which is electrically connected to said support structure, and amplification energizing means having power supply leads for connection to a grounded external power source, one of said power supply leads being electrically connected to said support structure; and selector means connected for supplying the desired signals to said input conductors from said signal supply means; said phonograph reproduction signal supply means including phonograph record supporting elements and phonograph pick-up supporting elements, at least part of which elements are electrically conductive, pick-up signal output leads at least one of which is insulated from said conductive part for connection to the selector means, and connecting means connecting said conductive part to the conductive amplifier support structure through a series resistor to diminish the pick-up of undesired signals by said phonograph reproduction signal supply means, and to reduce the electric shock hazard due to contact with exposed portions of its support structure.

4. In a phonograph record reproducing system: phonograph record supporting elements and phonograph transducer supporting elements, at least part of which elements are electrically conductive; transducer signal output leads at least one of which is insulated from said electrically conductive part for connection to an amplifier having an electrically conductive chassis and a signal return conductor essentially capacitively connected to the chassis, impedance means connected between said electrically conductive part and said signal return conductor to diminish electrical pick-up of undesired signals.

WILBURT D. RHOADS.

REFERENCES CITED

The following references are of record in the file of this patent:

UNITED STATES PATENTS

| Number | Name | Date |
|---|---|---|
| 2,079,636 | Sharp | May 11, 1937 |
| 2,252,057 | Blessing | Aug. 12, 1941 |
| 2,261,203 | Albright | Nov. 4, 1941 |
| 2,281,572 | Gage | May 5, 1942 |